United States Patent [19]

Seri et al.

[11] Patent Number: 5,149,383
[45] Date of Patent: Sep. 22, 1992

[54] HYDROGEN STORAGE ALLOY ELECTRODE

[75] Inventors: Hajime Seri, Izumiotsu; Yoshio Moriwaki, Hirakata; Akemi Shintani, Osaka; Tsutomu Iwaki, Yawata, all of Japan

[73] Assignee: Matsushita Electric Industrial Co., Ltd., Osaka, Japan

[21] Appl. No.: 677,572

[22] Filed: Mar. 29, 1991

[30] Foreign Application Priority Data

Apr. 3, 1990 [JP] Japan .................. 2-088540
Jul. 2, 1990 [JP] Japan .................. 2-174741

[51] Int. Cl.$^5$ .......................................... C22C 22/00
[52] U.S. Cl. ................................. 148/400; 420/422; 420/900
[58] Field of Search ............... 420/900, 422; 148/400

[56] References Cited

U.S. PATENT DOCUMENTS

| | | | |
|---|---|---|---|
| 4,144,103 | 3/1979 | Gamo et al. | 148/3 |
| 4,153,484 | 5/1979 | Gamo et al. | 148/32 |
| 4,160,014 | 7/1979 | Gamo et al. | 423/644 |
| 4,195,989 | 4/1980 | Gamo et al. | 423/644 |
| 4,228,145 | 10/1980 | Gamo et al. | 420/900 |
| 4,359,396 | 11/1982 | Maeland | 420/401 |
| 4,412,982 | 11/1983 | Wallace et al. | 423/644 |
| 4,551,400 | 11/1985 | Sapru et al. | 423/644 |
| 4,623,597 | 11/1986 | Sapru et al. | 420/900 |
| 4,637,967 | 1/1987 | Keem et al. | 420/900 |
| 4,661,415 | 4/1987 | Ebato et al. | 420/900 |
| 4,716,088 | 12/1987 | Reichman et al. | 420/900 |
| 4,728,586 | 3/1988 | Venkatesan et al. | 420/900 |
| 4,946,646 | 8/1990 | Gamo et al. | 420/900 |
| 4,983,474 | 1/1991 | Doi et al. | 420/900 |

FOREIGN PATENT DOCUMENTS

| | | |
|---|---|---|
| 0293660 | 12/1988 | European Pat. Off. |
| 6448370 | 2/1989 | Japan . |
| 6460961 | 3/1989 | Japan . |
| 1102855 | 4/1989 | Japan . |

OTHER PUBLICATIONS

M. A. Fetcenko, et al., "Hydrogen Storage Materials For Use In ...", 16th Intnl Power Sources Symposium, England, Sep. 1988.

M. A. Fetcenko, et al., "Alloy Effects On Cycle Life Of NiMH Batteries", 17th Intnl Power Sources Symposium, UK, Apr. 1991.

Patent Abstracts of Japan, vol. 3, No. 72 (C-49) Jun. 21, 1979, & JP-A-54 45 608 —whole abstract—.

Patent Abstracts of Japan, vol. 14, No. 239 (E-930) [4182], May 21, 1990 & JP-A-2 65 060.

Primary Examiner—Upendra Roy
Attorney, Agent, or Firm—Stevens, Davis, Miller & Mosher

[57] ABSTRACT

The present invention provides a hydrogen storage alloy electrode made of a pentanary or higher multi-component hydrogen storage alloy or a hydride thereof where the alloy comprises at least Zr, Mn, Cr, Ni, and M where M is one or more elements selected from V an Mo, and a major component of the alloy phase is $C_{15}$ ($MgCu_2$) type Laves phase. This hydrogen storage alloy electrode may be enhanced in its performance by subjecting the alloy after the production thereof to a homogenizing heat-treatment at a temperature of 900° to 1300° C. in vacuum or in an inert gaseous atmosphere.

8 Claims, 4 Drawing Sheets

HYDROGEN STORAGE ALLOY ELECTRODE

BACKGROUND OF THE INVENTION

1. Field of the Invention

The present invention relates to a hydrogen storage alloy electrode which is capable of reversibly absorbing and desorbing hydrogen in electrochemical process.

2. Description of Related Art

There have been lead-acid batteries and alkaline batteries widely used as storage batteries cells for various power supplies. Among them, the alkaline storage batteries have been expected to have a higher reliability and made miniature with a lighter weight. For the reason, the miniature type of alkaline storage batteries has been employed in various portable apparatuses while the large type has been employed in industrial applications.

In the alkaline storage batteries, positive electrodes have been made of nickel in most cases though there have been employed partly air and silver oxide as positive electrodes. The storage batteries have been improved in their performance as the electrodes have been changed from a pocket type to a sintered one, and have found ever broadening areas of application since the storage batteries were allowed to be sealed.

On the other hand, most negative electrodes are made of cadmium at present, though zinc, iron, hydrogen and the like besides cadmium have been considered for negative electrodes. In order to achieve a higher energy density, however, an interest has been directed to nickel-hydrogen storage batteries using metal hydrides, i.e., hydrogen storage alloy electrodes, and many proposals have been made for the production thereof.

The hydrogen storage alloy electrodes to be used as negative electrodes in the alkaline storage batteries, where the electrodes are made of hydrogen storage alloy capable of reversibly absorbing and desorbing hydrogen, have a higher theoretical capacity density than that of cadmium electrodes, and do not cause such a deformation, nor a formation of dendrites as may occur in the case of zinc electrodes. Therefore, they have a prolonged useful life and do not harm the environment so that they have been expected as negative electrodes for use in the alkaline storage batteries having a higher energy density.

As alloys to be used for the hydrogen storage alloy electrodes as above, multi-component alloys such as Ti—Ni and La(or Mm)—Ni systems have been generally well known. The multi-component alloy of the Ti—Ni system may be classified as an AB type (A is an element having a high affinity for hydrogen such as La, Zr, Ti and the like; B is a transition element such as Ni, Mn, Cr and the like), and is characterized by exhibiting a relatively high discharge capacity at an initial stage of charging and discharging cycles, but produces a problem that it is difficult to sustain the capacity for a long period of time while repeating the charging and discharging cycles. Another multi-component alloy, La(or Mm)—Ni system of an $AB_5$ type has been extensively studied recently as electrode material, and regarded as more promising alloy material so far. However, this alloy system also produces problems of a relatively small discharge capacity, insufficient performance in the useful life as cell electrode, high material cost and the like. Therefore, there has been a need for novel hydrogen storage alloy material allowing a higher capacity and longer useful life.

In contrast, Laves phase alloy of an $AB_2$ type has a higher hydrogen absorbing ability, and has been considered promising for electrodes having a high capacity and long life. In this alloy system, there have been already proposed, for example, $Zr\alpha V\beta Ni\gamma M\delta$ alloy [Japanese Patent KOKAI (Laid-open) No. Sho 64-60961], $ZrMo\alpha Ni\beta$ alloy [Japanese Patent KOKAI (Laid-open) No. Sho 64-48370], and $AxByNiz$ alloy [Japanese Patent KOKAI (Laid-open) No. Hei 1-102855].

When the Laves phase alloy of the $AB_2$ type is used for electrodes, a higher discharge capacity and a possible longer life can be realized as compared with those obtainable using the multi-component alloys of the Ti—Ni system or the La (or Mm)—Ni system. However, a further enhancement of those performances are still being sought for the storage battery application.

SUMMARY OF THE INVENTION

An object of the present invention is to provide a hydrogen storage alloy electrode having a higher discharge capacity and a long useful life by improving the hydrogen storage alloy.

Another object of the present invention is to provide a process for producing such a hydrogen storage alloy electrode.

The present invention provides a hydrogen storage alloy electrode characterized by using a hydrogen storage alloy of a quinternary or higher multi-component system or hydrides thereof comprising at least Zr, Mn, Cr, Ni, and M, where M is one or more elements selected from V and Mo, and where a major phase in the alloy is Laves phase of a $C_{15}(MgCu_2)$ type.

As another aspect, the present invention is characterized by specifically subjecting the alloy after production thereof to homogenizing heat-treatment at a temperature of 900° to 1300° C. in vacuum or in an inert gaseous atmosphere.

DETAILED DESCRIPTION OF PREFERRED EMBODIMENTS

Figure 1:
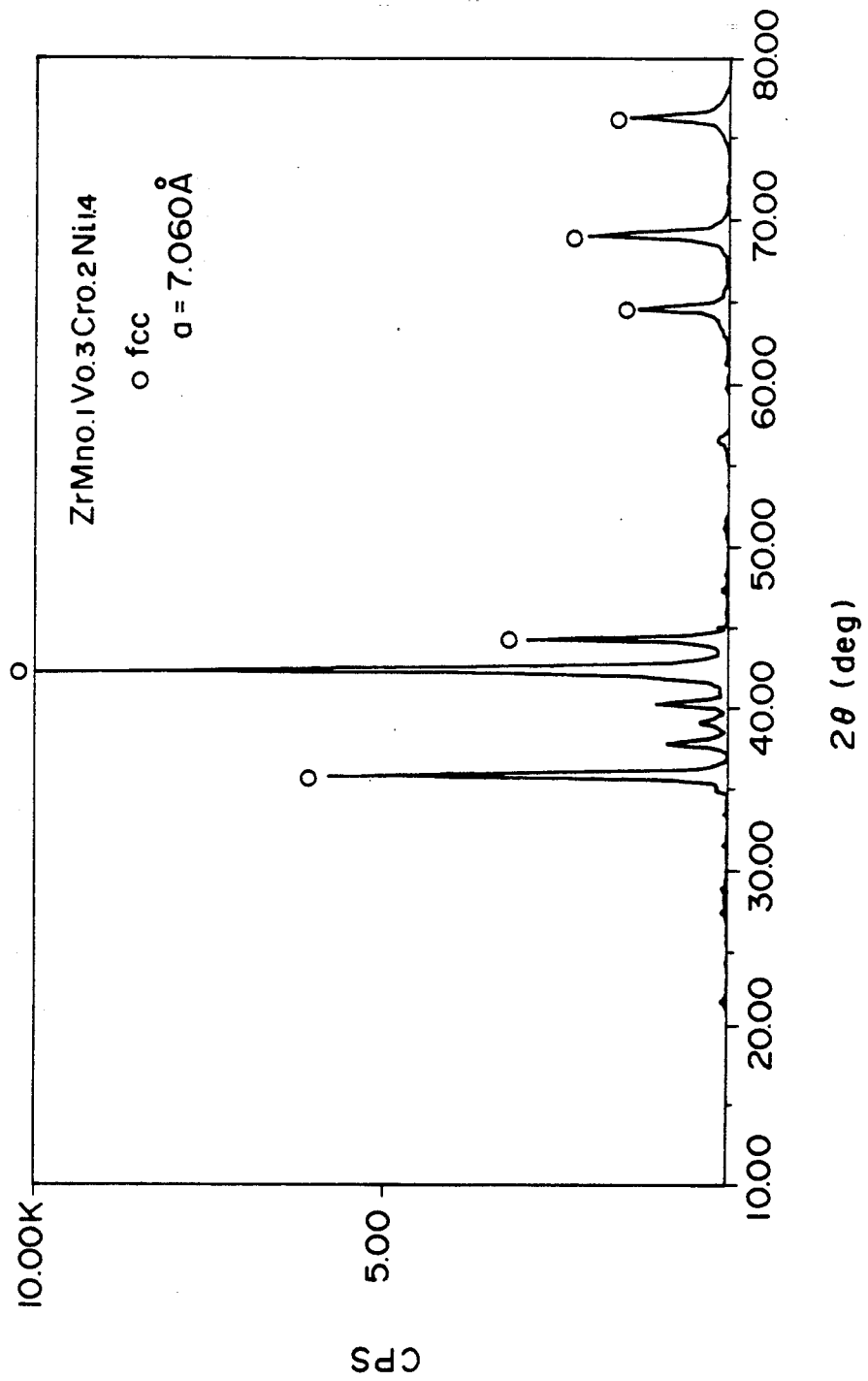
FIG. 1 is a X-ray diffraction pattern showing the results of X-ray diffraction analysis effected on an embodiment of the alloys according to the present invention.

The hydrogen storage alloy electrode according to the present invention could be realized by achieving an optimization of conventional Laves phase alloys. An optimum amount of V or Mo, which have a larger atomic radius, is added or incorporated in place of other elements into a hydrogen storage alloy to enlarge the crystalline lattice constant as compared to those of the conventional alloys, thereby increasing an amount of hydrogen to be absorbed and desorbed. Thus a higher amount of hydrogen can be absorbed and desorbed in the electrochemically charging and discharging process resulting in an increase in a discharge capacity. In addition, very stable performance can be maintained for a long period of time even when the charging and discharging cycle is repeated.

Therefore, the alkaline storage batteries, for example, nickel-hydrogen cells using the electrodes of the present invention are allowed to have a higher capacity, longer life, and excellent rapid charging and discharging characteristics as compared with those of conventional storage batteries of this type.

Moreover, the alloy as produced may be particularly heat-treated at a temperature of 900° to 1300° C. in vacuum or in an atmosphere of inert gas to improve a plateau property as well as to enhance the hydrogen absorbing property, which allows the batteries to have a higher capacity.

EXAMPLES

The present invention will be further explained with reference to practical examples.

Alloys of compositions as indicated in Table were produced by using metal materials such as commercially available Zr, Mn, V, Mo, Cr, and Ni, and melting the materials with heat in an arc furnace in an argon atmosphere to produce the alloys. Then the alloys were heat-treated in vacuum at a temperature of 1100° C. for 12 hours to produce alloy samples.

A part of the alloy samples was used for alloy analysis as by X-ray diffraction and measurements of amounts of hydrogen to be absorbed and desorbed in an hydrogen atmosphere [i.e., by conventional determinations of P-C-T (hydrogen pressure-composition isotherms)], and other part was used for evaluation of electrode properties.

TABLE

| Sample No. | Alloy composition |
| --- | --- |
| 1 | $ZrCr_{0.8}Ni_{1.2}$ |
| 2 | $Zr_{0.8}Mn_{0.4}Cr_{0.4}Ni_{1.2}$ |
| 3 | $ZrV_{0.3}Cr_{0.3}Ni_{1.4}$ |
| 4 | $ZrMn_{0.4}V_{0.1}Ni_{1.6}$ |
| 5 | $ZrMo_{0.3}Cr_{0.3}Ni_{1.4}$ |
| 6 | $ZrMn_{0.4}Mo_{0.1}Ni_{1.6}$ |
| 7 | $ZrMn_{0.1}V_{0.3}Cr_{0.2}Ni_{1.4}$ |
| 8 | $ZrMn_{0.5}V_{0.1}Cr_{0.2}Ni_{1.2}$ |
| 9 | $ZrMn_{0.3}V_{0.2}Cr_{0.2}Ni_{1.3}$ |
| 10 | $ZrMn_{0.2}V_{0.2}Cr_{0.2}Ni_{1.4}$ |
| 11 | $ZrMn_{0.2}V_{0.2}Cr_{0.3}Ni_{1.3}$ |
| 12 | $ZrMn_{0.3}V_{0.1}Cr_{0.3}Ni_{1.3}$ |
| 13 | $ZrMn_{0.2}V_{0.1}Cr_{0.4}Ni_{1.3}$ |
| 14 | $ZrMn_{0.4}V_{0.1}Cr_{0.2}Ni_{1.3}$ |
| 15 | $ZrMn_{0.1}V_{0.3}Cr_{0.1}Ni_{1.5}$ |
| 16 | $Zr_{1.1}Mn_{0.3}V_{0.1}Cr_{0.2}Ni_{1.4}$ |
| 17 | $Zr_{1.05}Mn_{0.3}V_{0.1}Cr_{0.2}Ni_{1.3}$ |
| 18 | $Zr_{0.95}Mn_{0.5}V_{0.1}Cr_{0.2}Ni_{1.2}$ |
| 19 | $Zr_{0.95}Mn_{0.2}V_{0.2}Cr_{0.2}Ni_{1.4}$ |
| 20 | $Zr_{0.9}Mn_{0.3}V_{0.2}Cr_{0.2}Ni_{1.3}$ |
| 21 | $Zr_{0.9}Mn_{0.2}V_{0.2}Cr_{0.3}Ni_{1.3}$ |
| 22 | $ZrMn_{0.1}Mo_{0.3}Cr_{0.2}Ni_{1.4}$ |
| 23 | $ZrMn_{0.5}Mo_{0.1}Cr_{0.2}Ni_{1.2}$ |
| 24 | $ZrMn_{0.3}Mo_{0.2}Cr_{0.2}Ni_{1.3}$ |
| 25 | $ZrMn_{0.2}Mo_{0.2}Cr_{0.2}Ni_{1.4}$ |
| 26 | $ZrMn_{0.2}Mo_{0.2}Cr_{0.3}Ni_{1.3}$ |
| 27 | $ZrMn_{0.3}Mo_{0.1}Cr_{0.3}Ni_{1.3}$ |
| 28 | $ZrMn_{0.2}Mo_{0.1}Cr_{0.4}Ni_{1.3}$ |
| 29 | $ZrMn_{0.4}Mo_{0.1}Cr_{0.2}Ni_{1.3}$ |
| 30 | $ZrMn_{0.1}Mo_{0.3}Cr_{0.1}Ni_{1.5}$ |
| 31 | $Zr_{1.1}Mn_{0.3}Mo_{0.1}Cr_{0.2}Ni_{1.4}$ |
| 32 | $Zr_{1.05}Mn_{0.3}Mo_{0.1}Cr_{0.2}Ni_{1.3}$ |
| 33 | $Zr_{0.95}Mn_{0.5}Mo_{0.1}Cr_{0.2}Ni_{1.2}$ |
| 34 | $Zr_{0.95}Mn_{0.2}Mo_{0.2}Cr_{0.2}Ni_{1.4}$ |
| 35 | $Zr_{0.9}Mn_{0.3}Mo_{0.2}Cr_{0.2}Ni_{1.3}$ |
| 36 | $Zr_{0.9}Mn_{0.2}Mo_{0.2}Cr_{0.3}Ni_{1.3}$ |
| 37 | $ZrMn_{0.1}V_{0.2}Mo_{0.1}Cr_{0.2}Ni_{1.4}$ |
| 38 | $ZrMn_{0.1}V_{0.1}Mo_{0.2}Cr_{0.2}Ni_{1.4}$ |
| 39 | $ZrMn_{0.3}V_{0.1}Mo_{0.1}Cr_{0.2}Ni_{1.3}$ |

TABLE-continued

| Sample No. | Alloy composition |
| --- | --- |
| 40 | $Zr_{0.9}Mn_{0.3}V_{0.1}Mo_{0.1}Cr_{0.2}Ni_{1.3}$ |

Samples Nos. 1 to 6 illustrate alloy compositions containing differnt elements than those in the present invention, and samples Nos. 7 to 40 illustrate some of hydrogen storage alloys according to the present invention. X-ray diffraction analysis confirmed that the hydrogen storage alloys of the present invention after heat-treatment in vacuum comprise $C_{15}$ type Laves phase as major component. As an example, X-ray diffraction pattern of sample No. 7 is shown in FIG. 1. $C_{15}$ type Laves phase has a fcc (face-centered cubic) lattice structure. The appearance of a large sharp peak indicating fcc as can be seen from FIG. 1 proves that a major component in the alloy phase is $C_{15}$ type Laves phase. The aforementioned fcc peak is larger and sharper than those found in X-ray diffraction patterns taken on the alloys before heat-treatment, which proves that the heat-treatment allowed a proportion of $C_{15}$ type Laves phase to increase and the homogeneity and crystallinity of the alloys to be enhanced.

Figure 2:
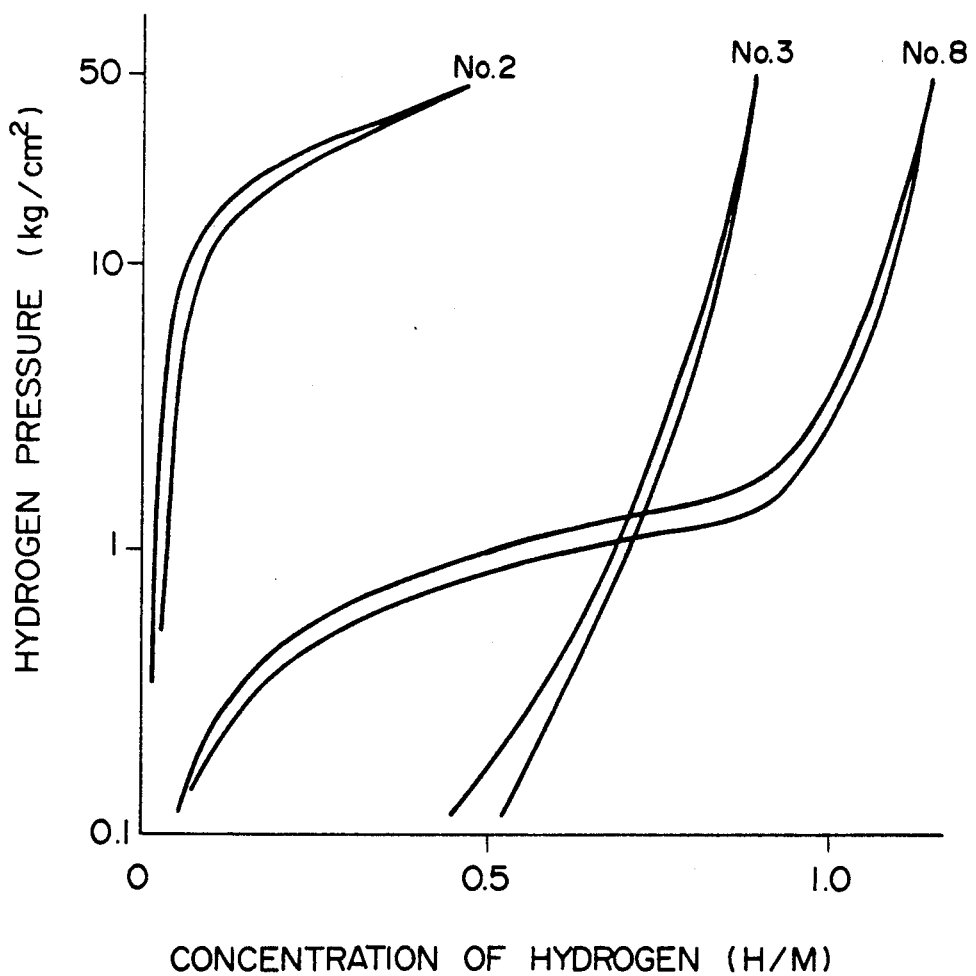
FIG. 2 is a diagram showing hydrogen-composition isotherms resulting from P-C-T measurements.

Alloys of sample Nos. 1 to 40 were first subjected to P-C-T measurements for determining hydrogen absorbing-desorbing properties in an atmosphere of hydrogen gas. Results of the measurements effected at 45° C. on the typical alloys are shown in FIG. 2. In FIG. 2, the abscissa represents the concentration of hydrogen per atom (H/M), the ordinate does the logarithm of a hydrogen pressure in terms of $kg/cm^2$, and the reference numbers correspond to samples numbers. It can be seen from FIG. 2 that an embodiment of the hydrogen storage alloys of the present invention, sample No. 8 exhibited a higher amount of hydrogen to be absorbed and desorbed and a good plateau property. In contrast, sample No. 3 exhibited a lower amount of hydrogen to be absorbed and a very low hydrogen pressure at equilibrium. Sample No. 2 exhibited a very high hydrogen pressure at equilibrium. From these results, it could be expected that the electrochemical absorption and desorption of hydrogen using the hydrogen storage alloys of samples Nos. 1 to 6 would result in a lower amount of hydrogen to be absorbed and desorbed than in case of the use of the hydrogen storage alloys according to the present invention (sample Nos. 7 to 40).

In the next place, cell tests were conducted for evaluation of electrode properties acting as negative electrode in actual electrochemically charging and discharging reaction in the secondary alkaline cells.

Alloys of samples Nos. 1 to 40 were ground into 400 mesh or lower in size. One gram of the ground alloys, 3 g of carbonyl nickel as conducting agent and 0.12 g of fine polyethylene powder as binder were sufficiently mixed and blended, formed by press into disks of 24.5 mm $\phi \times 2.5$ mm high. These disks were heated at a temperature of 130° C. for one hour to fuse the binder, thereby producing hydrogen storage alloys.

Figure 3:
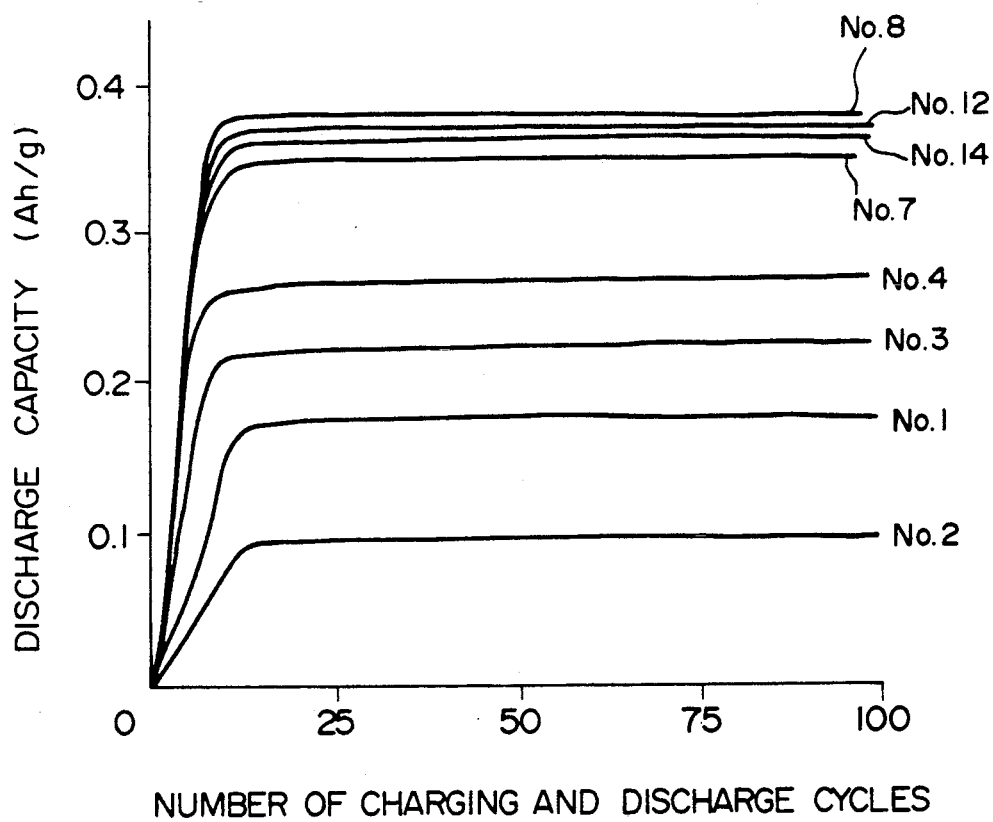
FIGS. 3 and 4 are diagrams showing the capacity characteristic versus the charging and discharging cycle in the cell test for various alloys indicated in Table.
Figure 4:
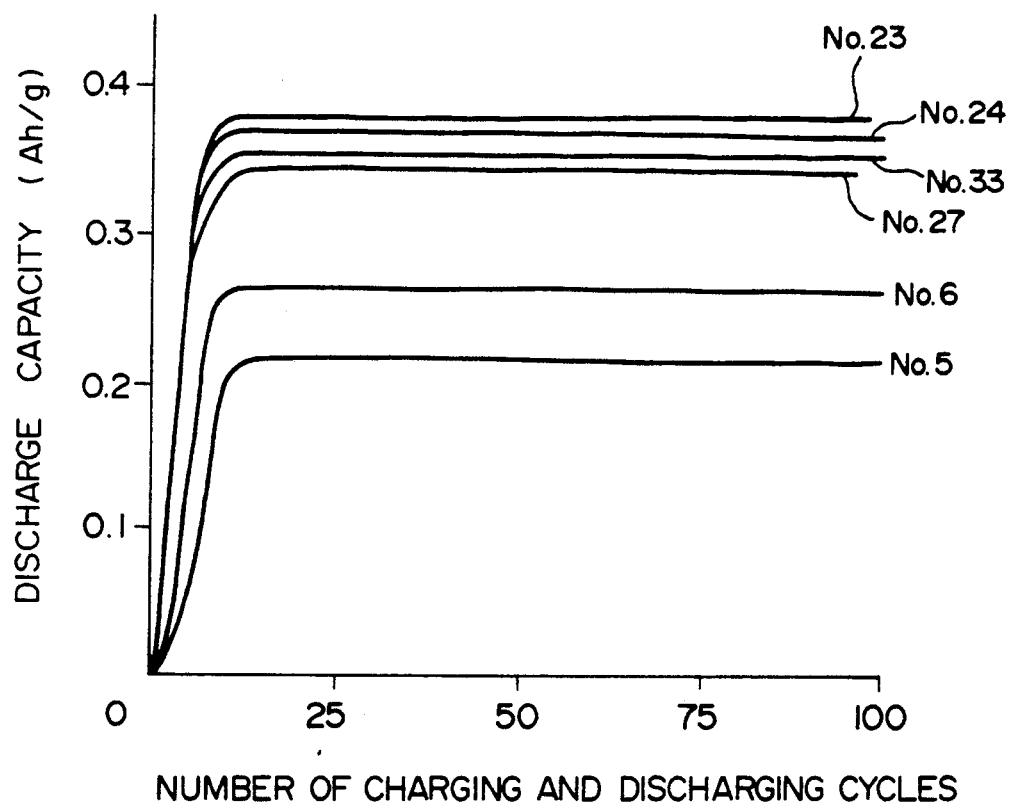

The hydrogen absorbing electrodes with nickel leads being attached thereto were used as negative electrodes, and sintered nickel electrodes having an excess capacity were used as positive electrodes. Further, nonwoven polyamide sheets were used as separatators, and an aqueous solution of potassium hydroxide having a specific gravity of 1.30 was used as electrolyte. The assembled storage batteries were measured for discharge capacities by repeating charging and discharging under a constant current at a temperature of 25° C. A quantity of electricity to be charged was 100 mA × 5 hours per gram of hydrogen storage alloy, and the discharging was conducted at 50 mA per gram with cutting at 0.8 V. The results were shown in FIGS. 3 and 4. In FIGS. 3 and 4, the abscissa represents the number of charging and discharging cycles, and the ordinate does the discharge capacity per gram of alloy. In FIGURs the reference number corresponds to the sample number indicated in Table. It could be found from FIG. 3 that whenever the hydrogen storage alloys of the present invention were employed, a discharge capacity as high as 0.35 Ah/g could be achieved, and such high capacity be stably maintained even when the charging and discharging cycle was repeated.

Tightly closed type of nickel-hydrogen storage batteries structured with these alloys will now be illustrated.

Two sorts of alloys, Nos. 7 and 8 selected from the alloys of the present invention shown in Table were ground into particles of 400 mesh or lower, each of the ground hydrogen storage alloys was mixed with an dilute aqueous solution of carboxy methyl cellulose (CMC) to produce a paste which was filled in a foamed nickel sheet having an average pore size of 150μ, a porosity of 95% and a thickness of 1.0 mm. The sheets were dried at a temperature of 120° C., compressed by a roller press, and coated on the surfaces thereof with fluorinated resin powder to produce hydrogen absorbing electrodes.

The electrodes were sized into dimensions of 3.3 cm wide × 21 cm long × 0.40 mm thick, to which lead plates were attached at two predetermined sites thereof. Then, each electrode, a positive electrode and a separator were assembled into a three layered composite which was spirally rolled into a cylindrical form, and then placed in an electrolyte cell of a SC size. In this case, as selected positive electrode, a known foamed nickel electrode was selected in the form of 3.3 cm wide × 18 cm long. Again to the positive electrode were attached lead plates at two predetermined sites. The separator was used which was made of a hydrophilic imparted non-woven polypropylene fabric. For electrolyte, an aqueous solution of potassium hydroxide of a specific gravity of 1.20 having 30 g/l lithium hydroxide dissolved was used. The cell was sealed to form a tightly sealed cell. The capacity of this cell is controlled with the positive electrode, and was made to have a theoretical capacity of 3.0 Ah.

10 batteries as above were made for each case and evaluated in the conventional charging and discharging cycle test. That is, the charging and discharging cycle was repeated at a temperature of 20° C. with the charging being effected to 150% at 0.5 C. (at a 2 hour rate), and the discharging to the terminal voltage of 1.0 V at 0.2 C. (at a 5 hour rate). As a result, each battery exhibited an actual discharge capacity lower than the theoretical one at the initial stage of the cycles, but after several cycles reached 3.0 Ah of the theoretical capacity, retaining a stable battery performance in the charging and discharging tests up to 500 cycles.

Moreover, in order to evaluate the rapid charge and discharge properties of the batteries, the charging and discharging cycle was repeated at temperatures of 20° C. and 0° C. with the charging being conducted up to 150% at 2 C. (at a 0.5 hour rate) and the discharging being conducted similarly up to the terminal voltage of 1.0 at 2 C. (at the 0.5 hour rate). As a result, it was confirmed that these batteries had a lower internal pressure at the time of charging and a higher discharge voltage than those of the well known conventional rare earth metal-nickel based multi-component alloy of the $AB_5$ type.

The present invention will be now explained with respect to the functions of alloy components. Since Ni contributes the activity of electrochemically absorbing and desorbing hydrogen, the use of a higher amount of Ni for enhancing the activity results in an increase in the discharge capacity, but causes an reduction in the lattice volume, hence in the amount of hydrogen to be absorbed, because Ni has a smaller atomic radius. Then a metal M having a larger atomic radius (M is one or more elements selected from V and Mo) is added to or substituted for B sites in the Zr—Mn—Cr—Ni system alloys resulting in an enlargement of the lattice volume, hence an increase in the amount of hydrogen to be absorbed. In this way, the metal M contributes largely to the increase of the amount of hydrogen absorbed. Since the metal M has a very great affinity for hydrogen, however, too excess M metals allow the absorbed hydrogen to be bond therewith so that the hydrogen will remain in the alloy without being desorbed therefrom. Therefore, ratios of M and Ni in the composition should be $0 < \gamma \leq 0.3$ and $1.2 \leq \epsilon \leq 1.5$, respectively.

Moreover, if M is V, a balance in amount between V and Ni is very important in that a requirement of $1.1 \leq \epsilon - \gamma \leq 1.3$ must be satisfied. That is, the value of $\epsilon - \gamma$ is intimately related to the lattice constant which in turn has a relation to an equilibrium hydrogen pressure and the amount of hydrogen to be absorbed and desorbed. If the $\epsilon - \gamma$ is below 1.1, the lattice constant becomes higher than 7.08 Å to drastically lower the equilibrium hydrogen pressure, so that a lower amount of hydrogen is electrochemically absorbed and desorbed. If the $\epsilon - \gamma$ is above 1.3, then in contrary to the above, the lattice constant becomes lower than 7.05 Å with the equilibrium hydrogen pressure being higher, again resulting in an reduction in the amount of hydrogen to be electrochemically absorbed and desorbed.

The foregoings can similarly apply to the case where M is Mo, and therefore, $1.1 \leq \epsilon - \gamma \leq 1.3$ must be selected.

On the other hand, both Mn and Cr contribute to the flatness of the plateau region in P-C-T characteristics as well as to the hysteresis. If there is no Mn, the flatness of the plateau region is detracted so that an amount of absorbed hydrogen itself is reduced, while if no Cr is contained, the hysteresis is enlarged to diminish a ratio of desorbable hydrogen to the total amount of absorbed hydrogen. In addition, since Mn contributes to a degree of the activity of the surfaces of the alloy, a too excess amount of Mn results in a grossly large surface activity to impede the charging and discharging reaction because the surfaces becomes liable to corrode in an alkaline solution. If Cr exists too much, the hysteresis is smaller, which in turn causes a loss of the flatness of the plateau region resulting in an reduction in the amount of absorbed hydrogen itself. Therefore, most preferably the amount of Mn should be $0 < \beta \leq 0.5$, and that of Cr be $0 > \delta \leq 0.4$.

As an amount of Zr varies from 1.0, the composition of the alloy deviates from the theoretical one. If it is lower than 1.0, a proportion of $C_{15}$ Laves phase increases, but the lattice constant decreases causing an reduction in the amount of absorbed hydrogen. In contrary, if it is higher than 1.0, the lattice constant increases, but homogeneity of the alloy is degraded. Therefore, there exists a most suitable range in the amount of Zr which is $0.9 \leq \alpha \leq 1.1$.

In addition, the highest discharge capacity can be achieved either by controlling the crystalline lattice constant in the range of 7.05 Å $\leq a \leq$ 7.08 Å when M is V, or by controlling the lattice constant in the range of 7.05 Å $\leq a \leq$ 7.08 Å, when M is Mo, as illustrated by samples Nos. 0.8 and 23.

As discussed above, in order to attain a hydrogen storage alloy electrode having a higher capacity and a longer life, it is important to satisfy the requirement for the alloy composition according to the present invention The hydrogen storage alloys comprising Zr, Mn, Cr Ni and M may be added with other elements such as Mg, Ca, Ti, Hf, Fe, Co, Cu, Ag, Zn, Sn, Pb, Al, and the like to achieve similar excellent performances as well as to be useful for the present invention in so far as the requirements for the alloys of the present invention are satisfied.

The hydrogen storage alloy electrodes according to the present invention have an alloy composition containing M where M is one or more elements selected from V and Mo so that they have a higher discharge capacity, allow the alkaline storage batteries to have a higher capacity, and can sustain a higher capacity for a longer time period even when the charging and discharging cycle was repeated as compared to conventional hydrogen storage alloy electrodes.

Moreover, the heat-treatment at predetermined temperatures effected on the alloys after the production thereof achieves an enhancement in P-C-T characteristics so that when a cell is assembled, a further higher capacity can be attained.

What is claimed is:

1. A hydrogen storage alloy electrode made of a five-membered or six-membered hydrogen storage alloy or a hydride thereof, the major phase of which is Laves phase of a $C_{15}(MqCu_2)$ type, the formula of said alloy being represented by $Zr_\alpha Mn_\beta M_\gamma Cr_\delta Ni_\epsilon$, wherein M is one or more elements selected from V and Mo; $0.9 \leq \alpha \leq 1.1$; $0 \leq \beta \leq 0.5$; $0 < \gamma \leq 0.2$; $0 < \delta \leq 0.4$; and $1.2 \leq \epsilon \leq 1.3$.

2. The hydrogen storage alloy electrode according to claim 1, in which M is V alone, and the crystalline lattice constant a is in the range of 7.04 Å $\leq a \leq$ 7.10 Å.

3. The hydrogen storage alloy electrode according to claim 1, in which M is Mo alone, and the crystalline lattice constant a is in the range of 7.04 Å $\leq a \leq$ 7.13 Å.

4. The hydrogen storage alloy electrode according to claim 1, wherein said alloy is subjected, after production thereof, to a homogenizing heat-treatment at a temperature of 900°-1300° C. in one of a vacuum and an inert gas atmosphere.

5. The hydrogen storage alloy electrode according to claim 2, in which a ratio of Ni and V is $1.1 \leq \epsilon - \gamma \leq 1.3$.

6. The hydrogen storage alloy electrode according to claim 2, in which the crystalline lattice constant of the $C_{15}$ type Laves phase is particularly in the range of 7.05 Å $\leq a \leq$ 7.08 Å.

7. The hydrogen storage alloy electrode according to claim 3, in which a ratio of Ni and Mo is $1.1 \leq \epsilon - \gamma \leq 1.3$.

8. The hydrogen storage alloy electrode according to claim 3, in which the crystalline lattice constant of the $C_{15}$ type Laves phase is particularly in the range of 7.05 Å $\leq a \leq$ 7.10 Å.

* * * * *